No. 792,908. PATENTED JUNE 20, 1905.
R. B. LEWIS.
MACHINE FOR FORMING AND SETTING METALLIC FASTENERS.
APPLICATION FILED OCT. 30, 1903.

Witnesses
Edwin L. Bradford

Inventor
Robert B. Lewis
By J. Chauville Meyers
Attorney

No. 792,903. PATENTED JUNE 20, 1905.
R. B. LEWIS.
MACHINE FOR FORMING AND SETTING METALLIC FASTENERS.
APPLICATION FILED OCT. 30, 1903.

Witnesses
Edwin L. Bradford Inventor
Robert B. Lewis
By J. Granville Meyer
Attorney No. 792,908. PATENTED JUNE 20, 1905.
R. B. LEWIS.
MACHINE FOR FORMING AND SETTING METALLIC FASTENERS.
APPLICATION FILED OCT. 30, 1903.

Inventor
Robert B Lewis

Witnesses
Edwin L Bradford

By
J. Granville Meyers
Attorney

No. 792,908.      Patented June 20, 1905.

UNITED STATES PATENT OFFICE.

ROBERT B. LEWIS, OF PHILADELPHIA, PENNSYLVANIA, ASSIGNOR TO THE AMERICAN METAL EDGE BOX COMPANY, OF PHILADELPHIA, PENNSYLVANIA, A CORPORATION OF NEW JERSEY.

MACHINE FOR FORMING AND SETTING METALLIC FASTENERS.

SPECIFICATION forming part of Letters Patent No. 792,908, dated June 20, 1905.

Application filed October 30, 1903. Serial No. 179,209.

*To all whom it may concern:*

Be it known that I, ROBERT B. LEWIS, a citizen of the United States, residing at Philadelphia, in the county of Philadelphia and State of Pennsylvania, have invented new and useful Improvements in Machines for Setting and Forming Metallic Fasteners, of which the following is a specification.

This invention relates to machines for shaping and applying fasteners to paper-board, leather articles, and the like; and it is particularly designed for shaping and inserting the fasteners or rivets shown and described in Letters Patent of the United States granted to J. S. Stokes on the 28th day of October, 1902, although it will be obvious that the invention is well adapted for shaping and inserting various other rivets or metallic fastenings—such, for instance, as shown in the patent to E. Heynen, No. 526,443, dated September 25, 1894.

The present invention is designed to improve the machine for shaping and applying fasteners or rivets forming the subject-matter of the United States patent application of Robert Coates, Serial No. 141,651, filed February 3, 1903, with the following objects particularly in view: first, to impart a constant and uniform motion to the feed-lever which feeds the fastener-strip to the machine; second, to construct the feed-lever in such manner that it may be adjusted with respect to its fulcrum-pin when first applied to the machine and may be removed subsequently from the machine for cleaning and other purposes requiring disassemblage of parts without destroying its adjustment or rendering readjustment necessary when the lever is again placed in position on the machine; third, to render the feed-bar removable without necessity of removing the feed-lever which operates said feed-bar; fourth, to stop readily and quickly the movement of the several operating-cams and to prevent any backlash or rattle of said cams at the moment of stopping; fifth, to effect an intermittent movement of the cutter or tool which severs the fasteners from the fastener-strip with respect to the forming plunger or tool which shapes or forms the fasteners; furthermore, to render the operating means of the cutter adjustable, so as to regulate the stroke or throw of the cutter, and to provide for removing readily the cutter to examine its condition or sharpen its cutting edges without disturbing any adjustments of the cutter-operating mechanism; sixth, to time and adjust exactly the operation of the cutter with respect to the operation of the forming-plunger, whereby each fastener severed from the fastener-strip is immediately formed by the plunger without having an opportunity to become displaced in the machine; seventh, to reduce resistance to the forward movement of the fastener-strip adjacent to the cutting-die and effectually to prevent any retrogressive movement of said strip; eighth, to dispense with rack-and-pinion mechanism for operating the pivoted head which contains the female die in which the fasteners are formed by the forming-plunger and to render the action of this head more quiet and easy, thereby prolonging the life of the machine and insuring a better quality of work; ninth, to render the female die in which the fasteners are formed replaceable readily in the event that it becomes worn; tenth, to support the fastener-strip in such manner as to decrease the wear and strain on the feeding mechanism and to enable it to feed the fastener-strip easily and quickly to the cutting and forming mechanism; furthermore, to support the fastener-strip in such manner that it will not be bent or broken; eleventh, to permit the machine to be disconnected readily from the source of power, so that it may be operated by hand.

The first object of this invention is attained by the use of a wabbling cam, in the cam-groove of which one end of the feed-lever fits and by which said feed-lever is operated.

The second object is attained by the use of an eccentric bushing for the fulcrum of the feed-lever, which bushing is first properly adjusted with respect to the feed-lever and is then clamped immovably thereto and removed from the machine therewith in disassembling the parts.

The third object is attained by constructing the feed-lever with a movable plate which may be readily shifted when it is desired to remove the feed-bar for any reason.

The fourth object is attained by providing means for throwing the operating-cams out of engagement with their operating mechanism or for stopping suddenly their forward movement and for simultaneously applying a brake to said cams to prevent them from rebounding or rattling.

The fifth object is attained by using a bell-crank lever having an irregular way in one of its ends for operating the cutter which severs the fasteners from the fastener-strips. An eccentric bushing, carried by an arm which is mounted on the shank of the forming-plunger, fits into the irregular way of said bell-crank lever, and thereby imparts an intermittent movement to the cutter. One end of the irregular way is open, and consequently the lever may be disengaged from its operating-bushing and removed without disturbing any adjustments when it is desired to inspect the cutter or remove it for sharpening purposes.

The sixth object is attained by providing the arm on the shank of the forming-plunger with an adjusting-screw adapted to bear against a shoulder on the shank. By means of this adjusting-screw the position of the said arm may be adjusted accurately and the operation of the cutter thereby timed minutely with respect to the operation of the forming-plunger.

The seventh object is attained by extending the retaining-pin for preventing retrogressive movement of the fastener-strip through the stripper-block. This block is designed to raise slightly the fastener-strip after a fastener has been severed partially therefrom, so as to disengage the fastener-strip from the cutting-die. This arrangement permits the fastener-strip to be fed forward easily and without resistance over the cutting-die and retaining-pin to bring the next fastener into position to be severed partially at the moment that the first fastener is severed completely and formed by the forming-plunger. Two flat springs, one superimposed upon the other, are employed for operating the retaining-pin and stripper-block.

The eighth object is attained by forming a curved groove in the removable cover-plate which holds in place the reciprocatory bar by which the pivoted head is carried and by providing an outwardly-projecting pin on the pivoted head to engage and traverse the groove in said cover-plate as the reciprocatory arm is operated, and thereby swing said head from vertical to horizontal position, or vice versa.

The ninth object is attained by constructing the pivoted head of the reciprocatory arm in two parts, one of which contains the female die, in which the fasteners are formed. In the event that the female die becomes worn the part of the head in which it is formed is removed and a new part is applied.

The tenth object is attained by using a shallow tray having a removable cover. The fastener-strip is coiled on edge in this tray and is fed to the cutting and forming mechanism through a slot in the periphery thereof.

The eleventh object is attained by placing on the wabbling cam which operates the feed-lever a set-screw, by means of which the clutch-finger by which the machine is thrown into action from the driving-wheel can be locked in its disengaged position, allowing the machine to be turned into any desired position without disconnecting the power.

In order that the invention may be understood more fully, it will now be described in detail with reference to the accompanying drawings, forming a part of this specification, in which—

Like reference-numerals indicate like parts in the several figures of the drawings.

The frame of the machine comprises a standard 1, formed with a lateral extension 2. An anvil or work-support 3 is bolted or otherwise suitably secured to the lower portion of the standard 1.

Extending vertically through the lateral extension 2 of the standard 1 is a reciprocatory plunger 4. The purpose and manner of operating this reciprocatory plunger will be described hereinafter. Adjacent to the plunger 4 is a reciprocatory bar 5, which extends through a vertical groove in the side of the extension 2. The reciprocatory bar 5 is retained in its vertical groove by a removable cover-plate 6, which is bolted to the extension 2 by bolts 7. On its inner surface the cover-plate 6 is provided with a curved groove 8, the purpose of which will be described hereinafter. The reciprocatory bar 5 at its lower end is cut away, as shown at 9, and a head 10 is pivotally mounted in this cut-away portion of the reciprocatory bar by means of the pivot-pin 11. At its upper end the head 10 is provided with an outwardly-extending pin 12. As the bar 5 is reciprocated vertically the pin 12 of the pivoted head 10 enters and traverses the curved groove 8 of the removable cover-plate 6, and the pivoted head 10 is thereby swung from vertical to horizontal position, or vice versa. At its lower end, on the side opposite to the pin 12, the pivoted head 10 is formed with an extension 13. Removably attached to the lower end of the head 10 adjacent to the extension 13 by bolts 14 is a die element 15. Bored in the removable die element 15 is a female die 16, in which the fasteners are formed, as will be described hereinafter. Extending downwardly through the female die 16 is a die-plunger 17, which is formed at its upper end with an enlarged head 18 to limit the downward movement of the die-plunger and to receive the stroke of the reciprocatory plunger 4, as will be described more fully hereinafter. A catch 19, operated by a spring 20, is provided on the removable die element 15 to limit the upward or backward movement of the die-plunger 17 as a fastener is formed in the die 16.

Figure 1:
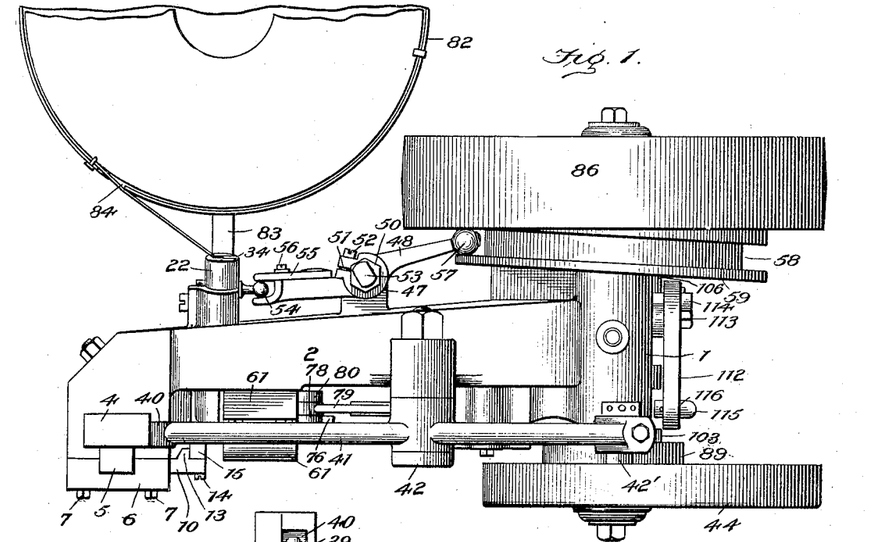
Figure 1 is a plan view of a machine constructed in accordance with the invention.
Figure 2:
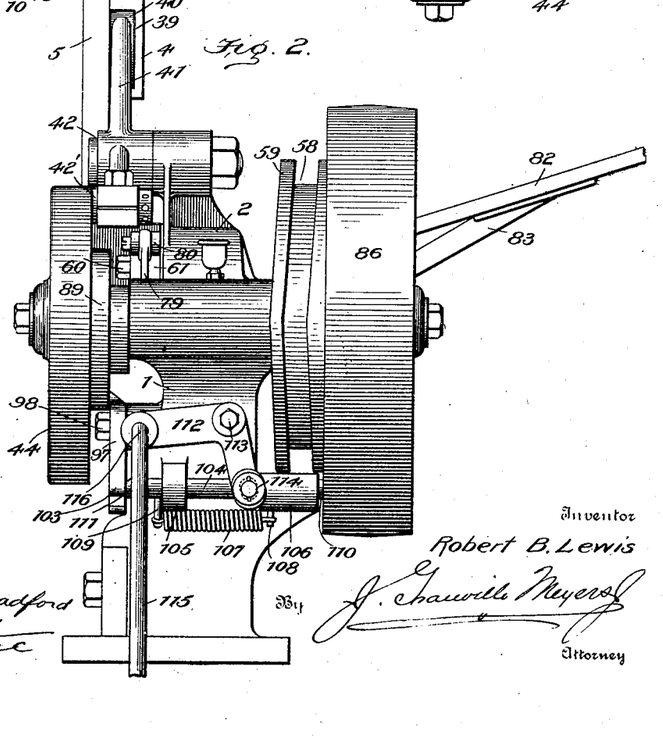
Fig. 2 is an end elevation thereof.
Figure 3:
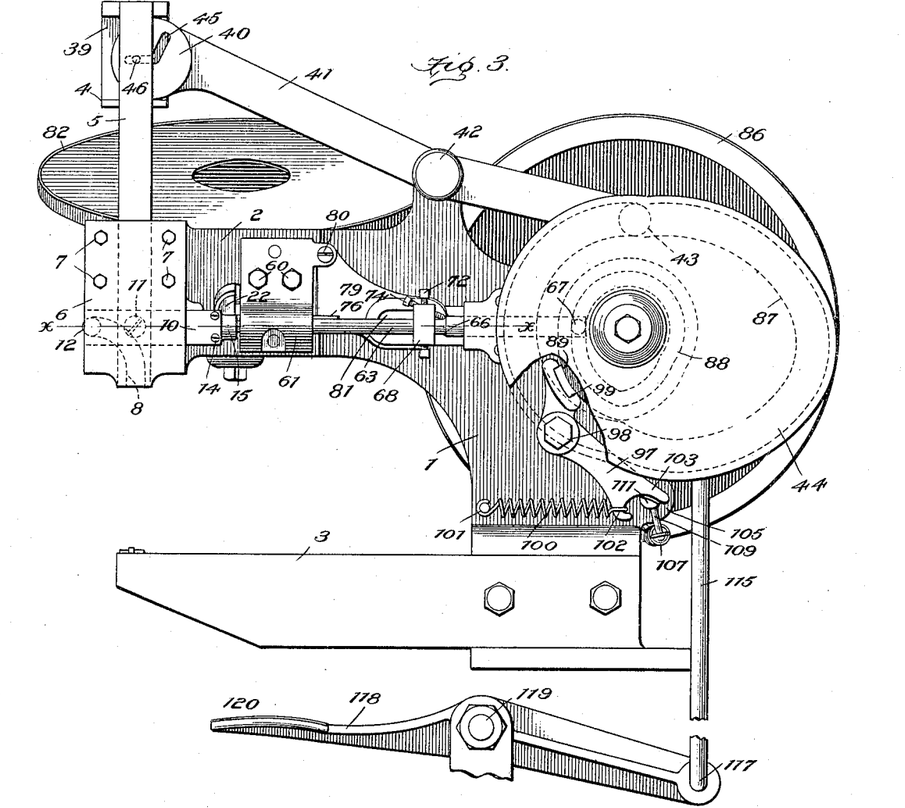
Fig. 3 is a side elevation thereof.
Figure 4:
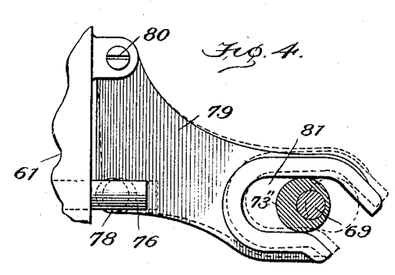
Fig. 4 is a detail view of the bell-crank lever for operating the cutter.
Figures 5, 6:
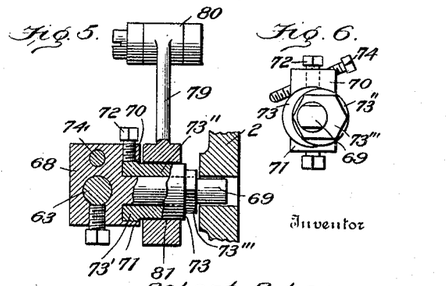
Fig. 5 is a detail sectional view, partly in elevation, showing the arm on the shank of the plunger for operating the cutter.
Fig. 6 is a detail elevation of said arm.
Figure 7:
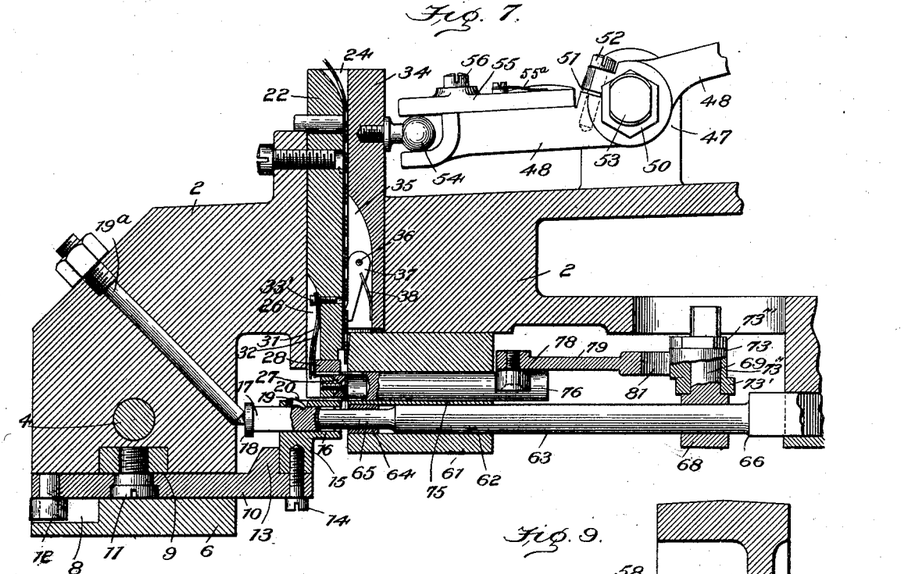
Fig. 7 is sectional view on the line $a$ $a$ of Fig. 3, the feed-lever being shown in elevation.
Figure 8:
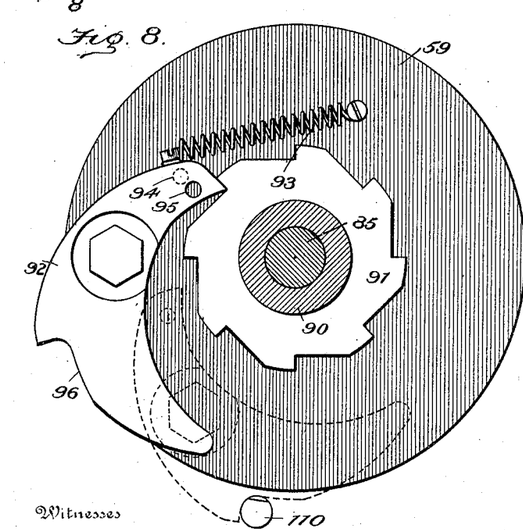
Fig. 8 is a detail view showing the manner of mounting the clutch-finger upon the wabbling cam.
Figure 9:
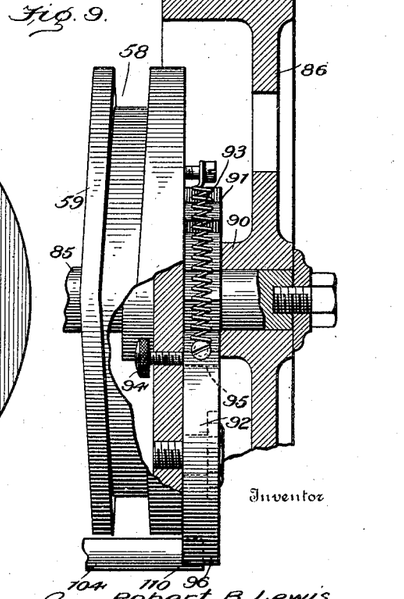
Fig. 9 is a view taken at right angles to Fig. 8, part of the wabbling cam being broken away more clearly to illustrate the construction of the clutch-finger.
Figure 10:
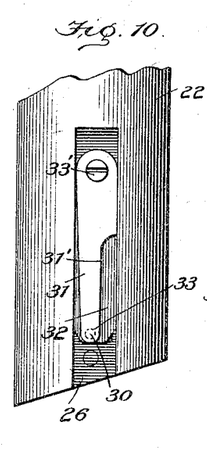
Figs. 10, 11, and 12 are a rear elevation, transverse section, and a front elevation, respectively, of the feed-guide.
Figure 11:
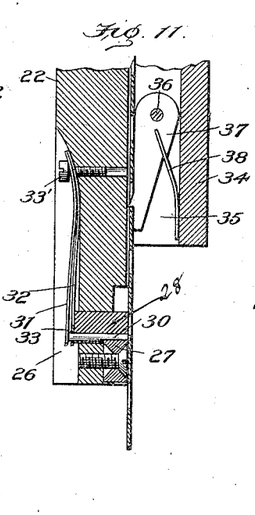
Figure 12:
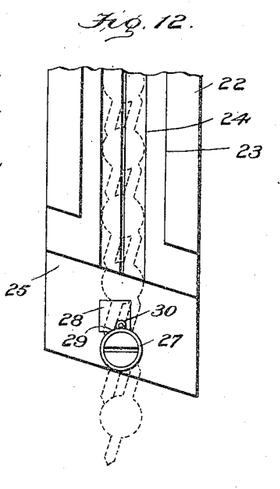

Instead of employing the parts 19 and 20 just described I may, and preferably do, employ an adjustable stop-rod 19$^a$ (see Fig. 7) for performing the functions of these parts.

In the event that the die 16 becomes worn or deformed it is necessary only to remove the bolts 14 and to substitute a new die element 15 for the one containing the worn or deformed die.

At its upper end the reciprocatory plunger 4 is formed with a horizontal guideway 39, which is open at each end. Fitting into the guideway 39 is the disk-shaped head 40 of a lever 41, which is pivoted at 42 to the extension 2 of the machine-frame. The end of the lever 41 opposite to the head 40 is provided with a laterally-extending eccentric pin 42'. An antifriction-roller 43 is mounted on the pin 42' and fits into an eccentric cam-groove in an operating-cam 44, by which means the lever 41 is rocked. The construction of the operating-cam 44 will be described more fully hereinafter.

The disk-shaped head 40 of the lever 41 is provided with an angular slot 45. On the inner side of the reciprocatory bar 5 is provided a laterally-extending pin 46, which fits into the angular slot 45 of the disk-shaped head 40 of the lever 41. The formation of the slot 45 is such that on the first part of the downward movement of the lever 41 the plunger 4 and the bar 5 descend together; but as the head 40 moves to the left in the guideway 39 of the plunger 4 the pin 46 of the bar 5 reaches the vertical extension of the slot 45 and the downward movement of the bar 5 ceases. This is when the pivoted head 10 of the bar 5 is adjacent to the anvil 3. The plunger 4, however, continues to descend, and its lower end strikes the enlarged upper end of the die-plunger 17, thereby forcing said die-plunger downward and ejecting the fastener contained in the die 16.

Extending transversely through the extension 2 is a feed-guide 22, which is approximately circular in cross-section and is held stationary in the extension 2 in any desired manner. A groove 23, approximately rectangular in cross-section, extends longitudinally of the feed-guide. In the bottom of the groove 23 is formed a shallow groove 24, which is designed to receive the fastener-strip as it is fed to the cutting and forming mechanism. At one end the feed-guide 22 is cut away obliquely, as shown at 25, on one side and longitudinally, as shown at 26, on the opposite side. A cutting-die 27 is carried by the cut-away portion 25 of the feed-guide. Adjacent to the cutting-die 27 the feed-guide is formed with a square perforation, which extends from the cut-away portion 25 to the cut-away portion 26. Loosely fitted in said square perforation is a stripper-block 28. This stripper-block is cut away at one of its upper corners, as shown at 29, and into this cut-away corner fits the periphery of the cutting-die 27. The cutting-die 27 therefore limits the outward movement of the stripper-block 28 and prevents the escape of said stripper-block from its square aperture when forced forward by the action of the heavy flat stripper-spring 32. Superimposed upon said spring 32 is a light flat spring 31, which bears at its free end upon the retaining-pin 30, which projects through an aperture in the spring 32 and is loosely carried through a perforation in the stripper-block. The outward movement of the retaining-pin 30 is prevented by the cutting-die 27, fitting a cut-away corner in same, which also serves to keep the retaining-pin 30 from rotating. The springs 31 32 are held together and are bolted in place in the cut-away portion 26 of the feed-guide 22 by a pin 33'. When the fastener-strip traversing the groove 24 is pressed against the die 27 in the operation of entirely severing one fastener from the strip and partially severing the next succeeding fastener, as will hereinafter appear, the stripper-block 28 and retaining-pin 30 are forced backward against the action of the springs 32 and 31. Then when the cutter is withdrawn from the vicinity of the cutting-die the stripper-block 28 and retaining-pin 30 are forced backward by their springs 32 and 31 and pushes the fastener-strip clear of the cutting-die 27. The stripper-block 28, being flat, offers no resistance to the feeding of the fastener-strip. The retaining-pin 30, being operated by the light spring 31 and beveled on the top, offers little obstruction to the forward motion of the fastener-strip as it is fed forward by the feeding mechanism. The feed is somewhat farther than the length of one fastener and the strip is withdrawn sufficiently to bring the retaining-pin 30 in contact with the head of the fastener, thereby holding the fastener-strip in exact position for the cutting operation. The feeding mechanism begins to retract before the cutter acts and insures the fastener-strip being in its proper position for the cutting and forming operations.

Fitting into the rectangular groove 23 of the feed-guide 22 is a reciprocatory feed-bar 34, which is slotted on one side, as shown at 35. Pivotally mounted in the slot 35 on a pivot-pin 36 is an outwardly-projecting pawl 37. Attached to the pawl 37 is a spring 38, which bears against the bottom of the slot 35 and normally holds the pawl in advanced position. Adjacent to the opposite end of the feed-bar 34 is a round-headed pin or stud 54, the purpose of which will be hereinafter described.

Pivoted at 47 to the extension 2 of the standard 1 is a feed-lever 48 for operating the feed-bar 34 of the fastener-strip-feeding mechanism. In practice it is found that the action of the feed-lever 48 in operating the feed-bar 34 is rendered more satisfactory if said lever is capable of eccentric adjustment to regulate the throw of the feed-bar and to facilitate the application of the feed-lever to the machine. In order to accomplish this result, an eccentric bushing 49 is provided for the feed-lever 48. The upper end of the eccentric bushing 49 is enlarged, as shown at 50, to provide a head which may be milled to fit an adjusting-wrench by which the bushing may be turned. In order to enable the bushing to be adjusted properly and then retained firmly in position, so that it will not loosen or change its eccentricity, the portion of the lever surrounding the bushing is split, as shown at 51, and an adjusting-screw 52 is passed through the jaws formed on said lever adjacent to the split 51. The feed-lever 48 is retained in position on the extension 2 by a fulcrum-pin 53, which passes through the eccentric bushing 49. When the feed-lever 48 is first placed in position upon the machine, the bushing 49 is adjusted in such manner as to give the lever 48 the desired relative adjustment with respect to the wabbling cam and to the feed-bar 34, and said bushing is then clamped immovably in the split portion of the feed-lever by means of the screw 52. If at any time subsequent to the first assembly of the machine parts it is desired to remove the feed-lever 48 for any reason, the only operation necessary is to remove the fulcrum-pin 53. This action does not necessitate or cause any disturbance to the adjustment of the eccentric bushing 49. In order to form a fork or crotch in the end of the feed-lever for engaging the stud 54 of the feed-bar, I provide on the outer side of said feed-lever a movable plate 55, which is pivotally held in place on the lever 48 by a bolt 56. Whenever it is desired to withdraw the reciprocatory bar 34 without disturbing the feed-lever 48, it is necessary only to turn or swing the plate 55 to one side on its pivot, as will be apparent. In order to prevent movement of the plate on its pivot, I mount on said plate a spring $55^a$, held in place at one end by a screw $55^b$ and at its free end engaging a detent-pin $55^c$, which moves in an opening $55^d$ in said plate. When the plate is in position to form the yoke, this pin $55^c$ engages with its lower end a recess $55^e$ in the lever 48 and which registers with the opening $55^d$, the engagement of the pin with said recess serving to prevent movement of the plate and the spring exerting its force to maintain the pin in engagement with the recess.

The feed-lever 48 at the end opposite the movable plate 55 is formed with a rounded head 57, which fits into the cam-groove 58 of a wabbling cam 59. By this means a continual to-and-fro motion is imparted to the feed-bar, and the jerky noisy movement thereof, which is caused by the straight cam-groove having a hump in one portion, as shown in the Coates application hereinbefore referred to, is avoided. The wabbling cam 59 will be described more specifically hereinafter.

The fastener-strip which is used by the machine is coiled on edge in a flat tray 82, which is stationarily supported by an arm 83, attached to the machine-frame in any desired manner. The fastener-strip is drawn through the peripheral opening 84 in the tray 82 by the strip-feeding mechanism of the machine. The position of the strip in the tray 82 is such that liability of said strip becoming kinked or broken is avoided, and as the strip turns readily in the stationary tray and passes easily through the opening 84 strain on the feeding mechanism is prevented.

Fastened to the extension 2 of the standard 1 by bolts 60 is a plunger-bracket 61. Passing longitudinally through a bore 62 in the plunger-bracket 61 is a forming-plunger 63. A bushing 64 is fitted into the end of the bore 62 adjacent to the pivoted head 10 of the reciprocatory bar 5 accurately to aline the forming-plunger in said bore and to readily permit of removal in case of wear. The forming-plunger 63 is reduced in size at its forward end, as shown at 65, and passes through the bushing 64. To the rear of the shoulder 65 the forming-plunger 63 is made with a shoulder 66, the purpose of which will be described hereinafter. At its rear end the forming-plunger 63 is provided with a laterally-extending pin 67, which fits into a cam-groove of the cam 44, hereinafter to be described. The cam 44 serves to impart a reciprocatory motion to the forming-plunger 63, as will be set forth presently.

Mounted upon the forming-plunger 63, between the shoulders 65 and 66 thereon, is an arm 68, which is provided with a laterally-extending pin 69. Adjacent to the pin 69 the arm 68 is formed with laterally-extending portions 70 71, which are cut away interiorly on a circle concentric with the pin 69. The laterally-extending portion 70 of the arm 68 is provided with a set-screw 72, the purpose of which will be described hereinafter. Mounted upon the pin 69 is a cylinder 73, which is formed with a round enlarged portion 73' to fit between the laterally-extending portions 70 71 and be clamped immovably therebetween by the set-screw 72, an eccentric portion 73'', the purpose of which will be described later, and a hexagonal or other suitably-shaped portion 73'''. The cylinder 73 may be held upon the pin 69 by any other means in addition to the set-screw 72. When it is desired to adjust the eccentricity of the cylinder 73, it is necessary only to loosen the set-screw 72, turn the projection to the proper position, and then retighten the set-screw.

Extending through the upper portion of the arm 68 and bearing against the shoulder 66 on the forming-plunger 63 is a pointed adjusting-screw 74. By means of this pointed adjusting-screw the longitudinal position of the arm 68 on the forming-plunger 63 may be adjusted with the nicest degree of accuracy.

Extending through a bore 75 in the plunger-bracket 61 is a reciprocatory cutter 76, the cutting end of which is formed with two diagonally and oppositely arranged cutting edges 77 77', by which means when the machine is in operation, as will be described hereinafter, one fastener may be completely severed from the fastener-strip when it is located over the forming-die and the next succeeding fastener may be severed partially from the fastener-strip. At its rear end the cutter 76 is pivotally connected in any suitable manner, as shown at 78, to a bell-crank lever 79. The bell-crank lever 79 is itself pivoted at 80 in any suitable manner to the upper portion of the plunger-bracket 61. An open-ended angular way 81 is formed in the rear end of the bell-crank lever 79. Into this angular way 81 fits the eccentric portion 73'' of the cylinder 73, carried by the arm 68 of the forming-plunger. It will be apparent that by reason of the angular way 81 an intermittent movement of the cutter 76 with respect to the forming-plunger 63 will be effected—that is to say, the cutter 76 will be operated by the bell-crank lever 79 only when the eccentric portion 73'' of the cylinder 73 is in the downwardly-curved portion of the way 81—and when said eccentric portion 73'' of the projection is traversing the straight horizontal portion of the way 81 no movement of the cutter will be caused. When it is desired to change the longitudinal throw of the cutter, the only operation necessary is to loosen the set-screw 72 on the enlarged portion 73' of the cylinder 73, turn the cylinder 73 to the proper eccentric position by means of 73''', and then clamp it against movement. Furthermore, when it is desired to inspect the cutter 76 for any reason it is necessary only to let the eccentric portion of the cylinder 73 pass out of the open end of the way 81 by lifting the bell-crank lever 79, which can be done by removing screw 80. In this operation it is unnecessary to change any adjustments of the machine, and the parts may be restored readily to their normal relation with each other, as will be apparent.

From the foregoing description it will be seen that by means of the adjustable cylinder 73 and the pointed adjusting-screw 74 on the arm 68 of the forming-plunger 63 the operation of the cutter 76 with respect to the operation of the forming-plunger 63 may be timed and adjusted with the greatest necessary degree of accuracy.

The cams 44 and 59 are rigidly mounted on a shaft 85, which is suitably journaled in the extension 1. A driving-wheel 86 is loosely mounted on the shaft 85. When it is desired to operate the cams 44 and 59, the cam 59 is geared to the driving-wheel 86 by a suitable clutch-finger hereinafter to be described. Said cams 44 and 59 are therefore operated simultaneously by means of the shaft 85, on which they are rigidly mounted.

The cam 44 is formed with two cam-grooves 87 88 and with a friction-surface 89. The friction-surface 89 is adapted to receive the frictional pressure of an automatically-operated brake, hereinafter to be described, for preventing rebound, rattle, or backlash of the cams 44 59 when the cam 59 is stopped suddenly by means of a clutch-finger bar, also hereinafter to be described. The roller 43 on the pin 42' of the lever 41 fits into the cam-groove 87 of the cam 44, and the pin 67 on the forming-plunger 63 fits into the cam-groove 88 of said cam. The lever 41 and the forming-plunger 63 are therefore operated simultaneously by the cam 44. It will be understood that the cam-grooves 87 and 88 of the cam 44 are eccentrically formed in such manner as to give the proper up-and-down and reciprocatory movements to the lever 41 and forming-plunger 63, respectively, and to impart these movements at the proper times.

The driving-wheel 86, on the side thereof next to the wabbling cam 59, is formed with a hub extension 90, and on this hub extension is a series of ratchet-teeth 91. Pivotally mounted on the wabbling cam 59 is a clutch-finger 92, which is adapted to be thrown into engagement with the ratchet-teeth 91 of the driving-wheel 86 to transmit the motion of said driving-wheel to said wabbling cam. A spiral spring 93, attached at one end to the clutch-finger 92 and at the other end to the wabbling cam 59, acts normally to maintain the clutch-finger 92 in engagement with the ratchet-teeth 91. A thumb-screw 94, passing through the wabbling cam 59 and having its enlarged head on the side of said cam opposite to said clutch-finger 92, is provided to hold the clutch-finger out of engagement with the teeth 91 when it is desired to stop the operation of the machine. The clutch-finger is formed with a perforation 95 to receive the point of the thumb-screw 94. When it is desired to gear the wabbling cam 59 to the driving-wheel 86, the point of the clutch-finger is permitted to be drawn by the spring 93 into engagement with the ratchet-teeth 91. This result is accomplished by turning the thumb-screw until its point leaves the perforation 95 of the clutch-finger and permits the spring 93 to act.

It will be observed that a portion 96 of the clutch-finger 92 projects beyond the periphery of the wabbling cam 59. This portion 96 of the clutch-finger is provided for engagement with a clutch-finger bar, hereinafter to be described, when it is desired to stop suddenly the rotation of the cam 59.

An automatic brake 97 for preventing backlash of the cams 44 and 59 when they are stopped suddenly is pivoted at 98 to the standard 1. The bearing-face 99 of the brake 97 engages the friction-surface 89 of the cam 44 when said brake is actuated. The brake 97 is thrown into engagement with the hub extension of the cam 44 by means of a spiral spring 100, attached at 101 to the standard 1 and at 102 to the brake 97. An extension 103 is formed on the brake 97 for the engagement of the clutch-finger bar, presently to be described, by which means the brake 97 is maintained out of engagement with the hub extension of the cam 44 when the machine is in operation.

A clutch-finger bar 104 is mounted for longitudinal movement in bearing-brackets 105 106 on the standard 1. A spiral spring 107, attached at one end to a pin 108 on the bracket 106 and at the other end to a pin 109 on the clutch-finger bar 104, serves to hold the finger-bar pin 109 up against the bracket 105, and consequently the finger-bar at one extreme of its longitudinal movement. The end 110 of the clutch-finger bar 104 is adapted to engage the extending portion 96 of the clutch-finger 92 and first trip said clutch-finger from its engagement with the teeth 91 and then stop the rotation of the cam 44. The opposite end 111 of the clutch-finger bar 104 is beveled, as shown, and is adapted to engage the portion 103 of the brake 97. It will be obvious that when the clutch-finger bar 104 is drawn to the limit of its longitudinal movement in one direction by the spring 107 the end 110 of said clutch-finger bar will engage the extension 96 of the clutch-finger 92, throwing the clutch-finger out of engagement with the teeth of ratchet 91, and prevent the rotation of the cams 44 and 59, at which time the brake 97, through its spring 100, will be in engagement with the friction-surface 89 of the cam 44; but when it is desired to permit the rotation of the cams 44 and 59 the clutch-finger bar 104 is moved in the opposite direction against the tension of its spring 107, the end 110 of the bar is moved away from the extension 96 of the clutch-finger 92, and the beveled end 111 of the clutch-finger bar is engaged with the portion 103 of the brake 97, thereby releasing said brake from frictional engagement with the friction-surface of the cam 44.

A bell-crank lever 112, which is pivoted at 113 to the standard 1, is connected at 114 to the finger-bar 104. It will be understood that a slot is formed in the bell-crank lever 112 at this point, so as to allow play between the bar and the lever when the former is actuated by the latter. A rod 115 is connected at 116 to the bell-crank lever 112. The lower end of the rod 115 is connected at 117 to a suitable treadle 118, which is pivoted at 119 to any suitable support for the machine. It will be seen that by depressing the foot-piece 120 of the treadle 118 the rod 115 is raised, the bell-crank lever 112 is rocked, the finger-bar 104 is moved out of engagement with the extension 96 of the clutch-finger 92, and the end 111 of said clutch-finger bar 104 is moved into engagement with the brake 97, thereby releasing said brake from frictional engagement with the friction-surface 89 of the cam 44. The machine is then ready for operation. It may be remarked here that the operator of the machine keeps his foot on the treadle 118 all during the operation of the machine, and when he desires to stop the machine he removes his foot. The spring 107 of the clutch-finger bar immediately moves said finger-bar into the path of the extension 96 on the clutch-finger 92 and said clutch-finger is tripped and the rotation of the cams 44 and 59 is stopped suddenly. At the same instant the opposite end of the finger-bar moves out of engagement with the brake 97, and the spring 100 of said brake immediately throws it into frictional engagement with the friction-surface of the cam 44, thereby preventing effectually any backlash or rattle of the cams 44 and 59.

Figures 13, 14, 15, 16, 17, 18:
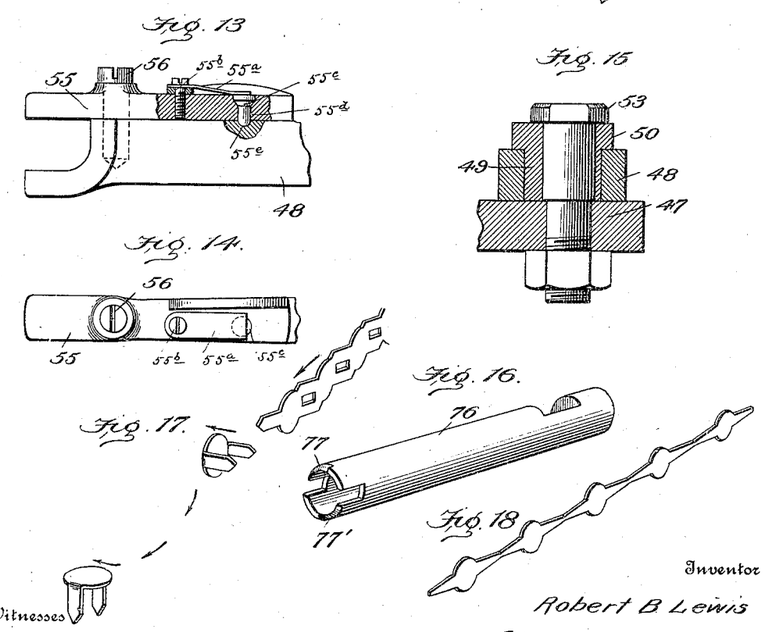
Fig. 13 is a detail view of one end of the feed-lever, showing the movable plate thereon.
Fig. 14 is a view taken at right angles to Fig. 13.
Fig. 15 is a detail sectional view, partly in elevation, of the eccentric bushing on the feed-lever.
Fig. 16 is a perspective view of the cutter.
Figs. 17 and 18 are perspective views of two different forms of strips that may be formed and set by the machine.

It will be understood that when the form of strip shown in Fig. 17 is used in the machine a cutter like that shown in Fig. 16 will be employed; but when a strip like that shown in Fig. 18 is used an ordinary single-blade cutter will be employed to sever the fasteners one at a time.

It is thought that the operation of the machine will be understood readily from the foregoing description.

Changes in the details of construction and specific arrangement of parts may be made by those skilled in the art without departing from the spirit or scope of the invention, and it is not desired to be limited in any way except as defined by the following claims.

Having thus described the invention, what I claim as new, and desire to secure by Letters Patent, is—

1. In a machine of the class described, a support, a reciprocatory bar on the support, a head pivotally connected thereto, the support having a camway, and the head provided with means engaging said camway, whereby the reciprocation of the bar swings said head into and out of longitudinal alinement with said bar.

2. In a machine of the class described, a reciprocatory bar, a head pivotally connected to said bar, a stationary plate adjacent to said bar, said plate having a curved groove therein, and a pin on said head adapted to engage the groove in said plate for swinging said head into and out of alinement with said bar, for the purpose specified.

3. In a machine of the class described, a reciprocatory bar, a head pivotally connected to said bar, a removable plate for holding said bar in position, said plate having a curved groove therein, and a pin on said head adapted to engage the groove in said plate for swinging said head into and out of alinement with said bar.

4. In a machine of the class described, a reciprocatory bar, a head pivotally connected to said bar, a removable die element on said head, and means for swinging said head into and out of alinement with said bar, for the purpose specified.

5. In a machine of the class described, means for forming and setting fasteners, a feed-guide, a die on said feed-guide, a cutter coöperating with said die, a stripper-block adjacent to said die, and a detent-pin extending through said stripper-block.

6. In a machine of the class described, means for forming and setting fasteners, a feed-guide, a die on said feed-guide, a cutter coöperating with said die, a movable stripper-block adjacent to said die, and an independently-movable detent-pin extending through said stripper-block.

7. In a machine of the class described, means for forming and setting fasteners, a feed-guide, a die on said feed-guide, a cutter coöperating with said die, a stripper-block adjacent to said die, a spring for operating said stripper-block, a detent-pin extending through said stripper-block, and a spring for operating said detent-pin.

8. In a machine of the class described, means for forming and setting fasteners, a feed-guide, a die on said feed-guide, a cutter coöperating with said die, a stripper-block adjacent to said die, a spring for operating said stripper-block, a detent-pin extending through said stripper-block, and a spring for operating said detent-pin, the spring for operating the stripper-block being mounted upon the spring for operating the detent-pin.

9. In a machine of the character described, a feed-guide, a feed-bar, a lever for operating said feed-bar, said lever having a split portion, an eccentric bushing mounted in the split portion of said lever, and means for clamping said bushing in position.

10. In a machine of the class described, a feed-guide, a feed-bar, a lever for operating said bar, said lever having a split portion, an eccentric bushing adjustably arranged in said split portion, and means carried by said lever to clamp the bushing in adjusted position.

11. In a machine of the class described, a feed-guide, a feed-bar, a lever for operating said feed-bar, an eccentric bushing for said lever, and means carried by the lever for clamping said bushing firmly in position.

12. In a machine of the class described, a feed-guide, a feed-bar, a lever for operating said feed-bar, said lever having a split portion, an eccentric bushing mounted in the split portion of said lever, and a screw on said lever for clamping said bushing firmly in position.

13. In a machine of the class described, a feed-guide, a feed-bar, a stud on said feed-bar, a feed-lever engaging said stud, and a movable plate on said feed-lever adjacent to said stud, whereby when said plate is moved said feed-bar may be withdrawn without disturbing said lever.

14. In a machine of the class described, a forming-die, a forming-plunger, a cutter, a bell-crank lever for operating said cutter, said bell-crank lever having a way therein, and a projection on said forming-plunger movable in the way of said bell-crank lever.

15. In a machine of the class described, a forming-die, a forming-plunger, a cutter, a bell-crank lever, for operating said cutter, said bell-crank lever having an open-ended way therein, and a projection on said forming-plunger fitting into the way of said bell-crank lever.

16. In a machine of the class described, a forming-die, a forming-plunger, a cutter, a bell-crank lever for operating said cutter, said bell-crank lever having a way therein, and an adjustable projection on said plunger fitting into the way of said bell-crank lever.

17. In a machine of the class described, a forming-die, a forming-plunger, an arm on said plunger, an eccentrically-adjustable element on said arm, a cutter, and a bell-crank lever for operating said cutter, said lever having a way therein to receive said eccentrically-adjustable element.

18. In a machine of the class described, a forming-die, a forming-plunger, an arm on said plunger, a rotatable element on said arm, said element having an eccentric portion, a set-screw for holding said element against turning movement, a cutter, and a bell-crank lever for operating said cutter, said bell-crank lever having a way therein to receive the eccentric portion of said rotatable element.

19. In a machine of the class described, a forming-die, a forming-plunger, a longitudinally-movable arm on said plunger, means for adjusting said arm, a projecting element on said arm, a cutter, and a bell-crank lever for operating said cutter, said bell-crank lever having a way therein to receive said projecting element.

20. In a machine of the class described, a forming-die, a forming-plunger, a longitudinally-movable arm on said plunger, an adjustable screw for adjusting the position of said arm on said plunger, a projecting element on said arm, a cutter, and a bell-crank lever for operating said cutter, said bell-crank lever having a way therein to receive said projecting element.

21. In a machine of the class described, a forming-die, a forming-plunger, a longitudinally-movable arm on said plunger, a pointed adjusting-screw on said arm for adjusting the position of said arm on said plunger, a rotatable element on said arm, said element having an eccentric portion, a set-screw on said arm for holding said element against turning movement, a cutter, and a bell-crank lever for operating said cutter, said bell-crank lever having an open-ended irregular way therein to receive said rotatable element.

22. In a machine of the class described, means for forming and setting fasteners, members engaging said means a plurality of cams engaging said members for operating said forming and setting means, a driving-wheel for operating said cams, and hand-operated means for throwing said cams into and out of gear with said driving-wheel.

23. In a machine of the class described, means for forming and setting fasteners, levers engaging said means a plurality of cams engaging said levers for operating said forming and setting means, a driving-wheel provided with ratchet-teeth, a clutch-finger on one of said cams adapted to be thrown into engagement with said ratchet-teeth to impart the movement of said driving-wheel to said cams, and hand-operated means for locking said clutch-finger out of operative position.

24. In a machine of the class described, means for forming and setting fasteners, levers engaging said means a plurality of cams engaging said levers for operating said forming and setting means, a driving-wheel provided with ratchet-teeth, a clutch-finger on one of said cams adapted to be thrown into engagement with said ratchet-teeth to impart the movement of said driving-wheels to said cams, and a thumb-screw for holding said clutch-finger out of engagement with said ratchet-teeth.

25. In a machine of the class described, means for forming and setting fasteners, members engaging said means a plurality of cams engaging said members for operating said forming and setting means, and means for stopping the forward movement of said cams and for simultaneously preventing backlash thereof.

26. In a machine of the class described, means for forming and setting fasteners, levers engaging said means a plurality of cams engaging said levers for operating said forming and setting means, a finger-bar for stopping suddenly the movement of said cams, a brake for preventing backlash of said cams when stopped suddenly, and means for simultaneously operating said finger-bar and said brake.

27. In a machine of the class described, means for forming and setting fasteners, levers engaging said means a plurality of cams engaging said levers for operating said forming and setting means, one of said cams having a clutch-finger formed with a projection, a brake, and a finger-bar for holding said brake out of operative position, said finger-bar when operated being adapted to engage the projecting portion of said clutch-finger, thereby tripping said clutch-finger and stopping suddenly the forward movement of said cams, and simultaneously to release said brake to prevent backlash of said cams.

28. In a machine of the class described, means for forming and setting fasteners, levers engaging said means a plurality of cams engaging said levers for operating said forming and setting means, one of said cams having a clutch-finger formed with a projection, a brake, a spring for operating said brake, a finger-bar for holding said brake out of operative position, a spring for moving said finger-bar out of engagement with said brake and in engagement with said clutch-finger, and a treadle for holding said finger-bar in engagement with said brake and out of engagement with said clutch-finger.

29. In a machine of the class described, a feed-guide, a feed-bar, a stud on said feed-bar, a feed-lever engaging said stud, and a pivoted plate on said feed-lever adjacent to said stud, whereby when said plate is moved said feed-bar may be withdrawn without disturbing said lever.

30. In a machine of the class described, a feed-guide, a feed-bar, a stud on said feed-bar, a feed-lever engaging said stud, a pivoted plate on said feed-lever adjacent to said stud, whereby when said plate is moved said feed-bar may be withdrawn without disturbing said lever, and means to prevent movement of the plate when in operative position.

31. In a machine of the class described, a feed-guide, a die on said feed-guide, a cutter coöperating with said die, and a stripper adjacent the die and movable transversly of the line of feed.

32. In a machine of the class described, a feed-guide, a die on said feed-guide, a cutter coöperating with said die, said cutter being movable at right angles to the guide, and a stripper adjacent the die and movable transversely of the line of feed.

In testimony whereof I have hereunto set my hand in presence of two subscribing witnesses.

ROBERT B. LEWIS.

Witnesses:
 WM. E. FRITZ,
 MARY McLAUGHLIN.